(No Model.)

C. G. MAYER.
GAS PUMP.

No. 350,378. Patented Oct. 5, 1886.

Attest:
Edward Stew
Geo. L. Wheelock

Inventor:
Chas. G. Mayer
By Knight Bros
Attys

United States Patent Office.

CHARLES G. MAYER, OF NAUVOO, ILLINOIS.

GAS-PUMP.

SPECIFICATION forming part of Letters Patent No. 350,378, dated October 5, 1886.

Application filed November 8, 1884. Renewed January 7, 1886. Serial No. 187,934. (No model.)

*To all whom it may concern:*

Be it known that I, CHARLES G. MAYER, of Nauvoo, in the county of Hancock and State of Illinois, have invented a certain new and useful Improvement in Gas-Pumps, of which the following is a full, clear, and exact description, reference being had to the accompanying drawings, forming part of this specification, in which—

Figure 1:
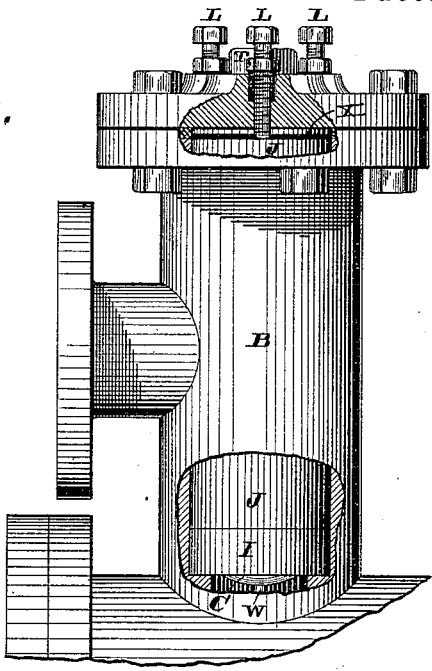
Figure 4:
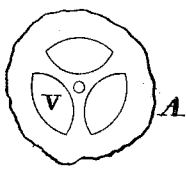
Figure 2:
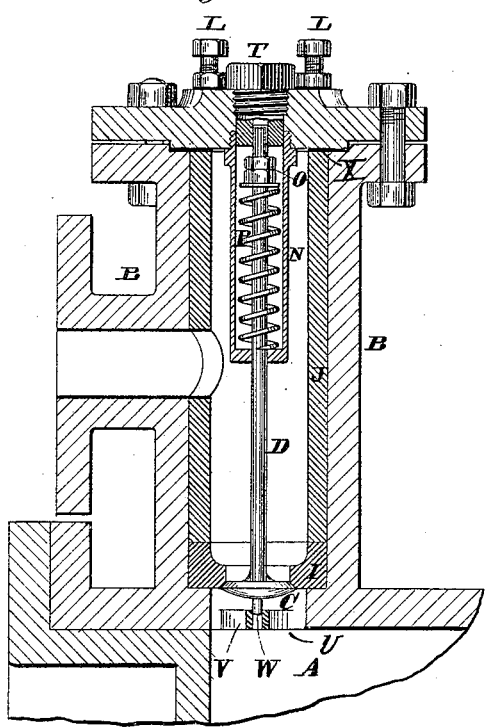
Figure 3:
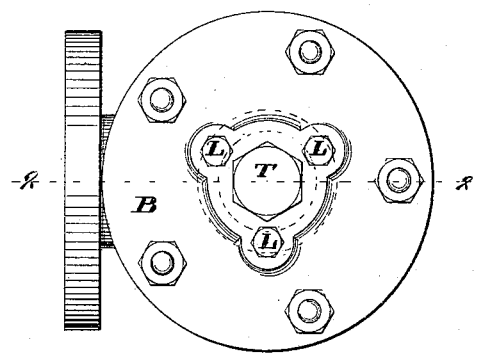

Figure 1 is a side elevation of part of a gas-pump embodying my improvement. Fig. 2 is a vertical section of same, taken on line 2 2, Fig. 3. Fig. 3 is a top view, and Fig. 4 is a detail view.

My invention relates to the valves of a gas-pump, and I have illustrated in the drawings the induction side of the pump.

My invention consists in features of novelty hereinafter fully described, and pointed out in the claim.

Referring to the drawings, A represents part of the cylinder of the pump, and B the housing of the valve.

C represents the valve, D its stem, I its seat, and J a casing made movable so that it can be adjusted by screws L, passing through the head of the housing. By tightening on the screws the casing is forced down tight upon the seat, and thus a perfectly-tight joint may be had at all times.

N represents a tube or casing surrounding the upper part of the valve-stem and screwed into or otherwise made fast to the top or head of the housing. On the upper end of the rod or stem is a nut or nuts, O, between which and the lower end of the tube is a spiral spring, P, surrounding the stem and tending to hold the valve closed. The hole made in the head of the housing to receive the tube is stopped by a screw-plug, T.

Beneath the valve in the induction-port U of the cylinder A is a spider, V, formed integrally with said cylinder, (see Figs. 2 and 4,) through the hub of which a short downwardly-projecting pin, W, on the valve extends. The main object of this spider is to prevent all danger of the valve getting into the cylinder by its stem breaking, which has heretofore been the cause of considerable damage and annoyance, and it also acts as a guide for the valve. This spider is formed wholly within the part U—that is to say, it does not project into the cylinder. This is important in view of the fact that it not infrequently happens that the piston-rod breaks or becomes otherwise detached from the piston. It will be seen, therefore, that in the event of such an accident if the spider projected and the piston should happen to be moving toward it, said spider would inevitably be broken. For this reason I locate the spider external to the cylinder. The tube N prevents any part of the spring getting into the cylinder should it be broken as is often the case, and in addition to that it holds the spring intact when broken in one or more places, so that it will still perform its function. The plug T is recessed, as shown in Fig. 2, to receive the upper end of the valve-stem and guide it.

X represents a gasket beneath the head of the housing.

I am aware that ports closed by outwardly-seated valves have been provided with spiders for catching said valves in the event of their becoming broken or detached; but such spiders have heretofore been secured in said ports by means of screw-threads, and the liability to their becoming loosened by the continual jar and falling into the cylinder is greater than that of the valves themselves falling in.

I claim as my invention—

The combination, with the valve C, having the stem D, and the housing B for said valve and stem, of the tube N, screwed into a threaded aperture through the end plate of said housing, the nut O on said stem, the spring interposed between said nut and the end of the tube, and the screw-plug T, closing the aperture through the housing, substantially as and for the purposes set forth.

CHARLES G. MAYER.

In presence of—
FREDRICK WOLF,
JULES HADUBARBIE.